(12) United States Patent
Hu et al.

(10) Patent No.: US 10,812,259 B2
(45) Date of Patent: Oct. 20, 2020

(54) SELF-ASSEMBLY BASED RANDOM NUMBER GENERATOR

(71) Applicant: INTERNATIONAL BUSINESS MACHINES CORPORATION, Armonk, NY (US)

(72) Inventors: Huan Hu, Yorktown Heights, NY (US); Kafai Lai, Poughkeepsie, NY (US); Sharathchandra Pankanti, Darien, CT (US); Rasit Onur Topalogu, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 217 days.

(21) Appl. No.: 15/798,841

(22) Filed: Oct. 31, 2017

(65) Prior Publication Data

US 2019/0132126 A1    May 2, 2019

(51) Int. Cl.
| | |
|---|---|
| *H04L 9/06* | (2006.01) |
| *H04L 9/08* | (2006.01) |
| *G06F 7/58* | (2006.01) |
| *H04L 9/32* | (2006.01) |

(52) U.S. Cl.
CPC ........... *H04L 9/0869* (2013.01); *G06F 7/588* (2013.01); *H04L 9/0637* (2013.01); *H04L 9/0866* (2013.01); *H04L 9/3278* (2013.01)

(58) Field of Classification Search
CPC ... H04L 9/0869; H04L 9/0637; H04L 9/3278; H04L 9/0866; G06F 7/588
See application file for complete search history.

(56) References Cited

U.S. PATENT DOCUMENTS

| | | | | |
|---|---|---|---|---|
| 6,831,980 B1* | 12/2004 | Borza | ..................... | G06F 7/588 380/44 |
| 9,374,370 B1* | 6/2016 | Bent, II | .............. | H04L 63/0442 |
| 2006/0235917 A1* | 10/2006 | Manber | ................. | H04L 9/0872 708/250 |
| 2014/0335324 A1 | 11/2014 | Kim et al. | | |
| 2015/0243008 A1 | 8/2015 | Isawa et al. | | |
| 2015/0277237 A1 | 10/2015 | Sutani et al. | | |
| 2016/0068429 A1 | 3/2016 | Terayama et al. | | |

(Continued)

FOREIGN PATENT DOCUMENTS

| | | |
|---|---|---|
| EP | 2876602 | 5/2015 |
| WO | 2016117104 | 7/2016 |

OTHER PUBLICATIONS

Nitika et al., Fingerprint Feature Extraction Using Hough Transform and Minutiae Extraction, IJCSMS International Journal of Computer Science & Management Studies, Jul. 2013, vol. 13, Issue 05, www.ijcsms.com.

(Continued)

*Primary Examiner* — Mohammad A Siddiqi
(74) *Attorney, Agent, or Firm* — Tutunjian & Bitetto, P.C.; Vazken Alexanian

(57) ABSTRACT

Methods and systems for generating a random number include extracting feature information from a structure having a random physical configuration. The feature information is converted to a string of binary values to generate a random number. Pseudo-random numbers are generated using the random number as a seed to improve the security of encrypted information.

15 Claims, 6 Drawing Sheets

(56) References Cited

U.S. PATENT DOCUMENTS

| | | | |
|---|---|---|---|
| 2017/0194356 A1* | 7/2017 | Cheng | H05K 999/99 |
| 2017/0235938 A1* | 8/2017 | Cambou | G06F 21/36 |
| | | | 726/6 |
| 2017/0264599 A1* | 9/2017 | O'Regan | G06F 21/32 |
| 2018/0241557 A1* | 8/2018 | Maes | G09C 1/00 |

OTHER PUBLICATIONS

Paul McLellan, Directed Self Assembly, Published Jul. 2012, Retrieved on Feb. 24, 2017 from: http://www.semiwiki.com/forum/content/1469-directed-self-assembly.html.

* cited by examiner

SELF-ASSEMBLY BASED RANDOM NUMBER GENERATOR

BACKGROUND

Technical Field

The present invention generally relates to random number generators and, more particularly, to the creation of physically unclonable structures that may be used as seeds for pseudo-random number generators, as cryptographic keys, and to convert biased random numbers to an unbiased form.

Description of the Related Art

It is difficult to generate truly random numbers by algorithmic means. In general, pseudo-random number generators will generate a predictable string of numbers based on a given "seed." While the numbers generated seem random to an observer, a person need only know the seed that was used to replicate the entire number string.

Natural sources of random numbers can also be used, but some applications for such numbers require a physical proof to be available. Furthermore, natural random numbers may be biased in some way, providing an uneven distribution of numbers in the possible range. As such, existing random number generators and pseudo-random number generators are inadequate for certain tasks due to the high computation speeds that are available. Such tasks include high-security communications, data storage, and blockchain-based distributed transaction processing.

SUMMARY

A method for generating a random number include extracting feature information from a structure having a random physical configuration. The feature information is converted to a string of binary values to generate a random number using a processor. Pseudo-random numbers are generated using the random number as a seed to improve the security of encrypted information.

A method for generating a random number includes forming a structure having a random physical configuration with a set of ridges and troughs that include line end features and branching features. An image of the structure is captured. Feature locations are extracted from the image. The feature information is converted to a string of binary values by assigning binary values to grid locations based on feature locations using a processor. The string of binary values is normalized to generate an unbiased random number. Pseudo-random numbers are generated using the random number as a seed to improve the security of encrypted information.

A system for generating a random number includes a feature extraction module configured to extract feature information from a structure having a random physical configuration. A binary conversion module includes a processor configured to convert the feature information to a string of binary values to generate a random number. A random number module is configured to generate pseudo-random numbers using the random number as a seed to improve the security of encrypted information These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention use a chemical self-assembly process to generate physical structures with truly random patterns. These patterns are then processed, for example using optical capture and feature recognition, to generate a string of random numbers. The present embodiments also have the ability to convert a random number to an unbiased form. The random numbers generated by the present embodiments can be used as seeds to pseudo random number generators, as a fixed secret key in cryptographic technologies (e.g., blockchains), or may be used directly. The random numbers extracted from the self-assembled physical structures therefore have a physical correspondence and can be repeatedly and reliably read from the physical structures.

In some embodiments, self-assembled physical structures are generated with an undirected self-assembly process. Unlike directed self-assembly, where the formation of structures is chemically induced by, e.g., chemo- or grapho-epitaxy to produce the structures according to a design, undirected self-assembly allows the self-assembly process to proceed without explicit guidance, producing truly random patterns. These patterns may then be made at any scale and are unclonable, which means that the technology to replicate them intentionally does not exist. Specifics regarding the chemical process by which the random structures can be fabricated are provided below.

The present embodiments thus provide physical proof for random numbers. A reproducible, random identification number can be mapped to unique physical objects. If the validity of a particular random number is called into question, the physical proof can be inspected to ensure that the correspondence is valid. This has applications in anti-counterfeiting as well as in encryption and security. The use of a truly random number enhances the security of any encryption system by making the seed for a pseudo-random number generator much more difficult to guess.

Figure 1:
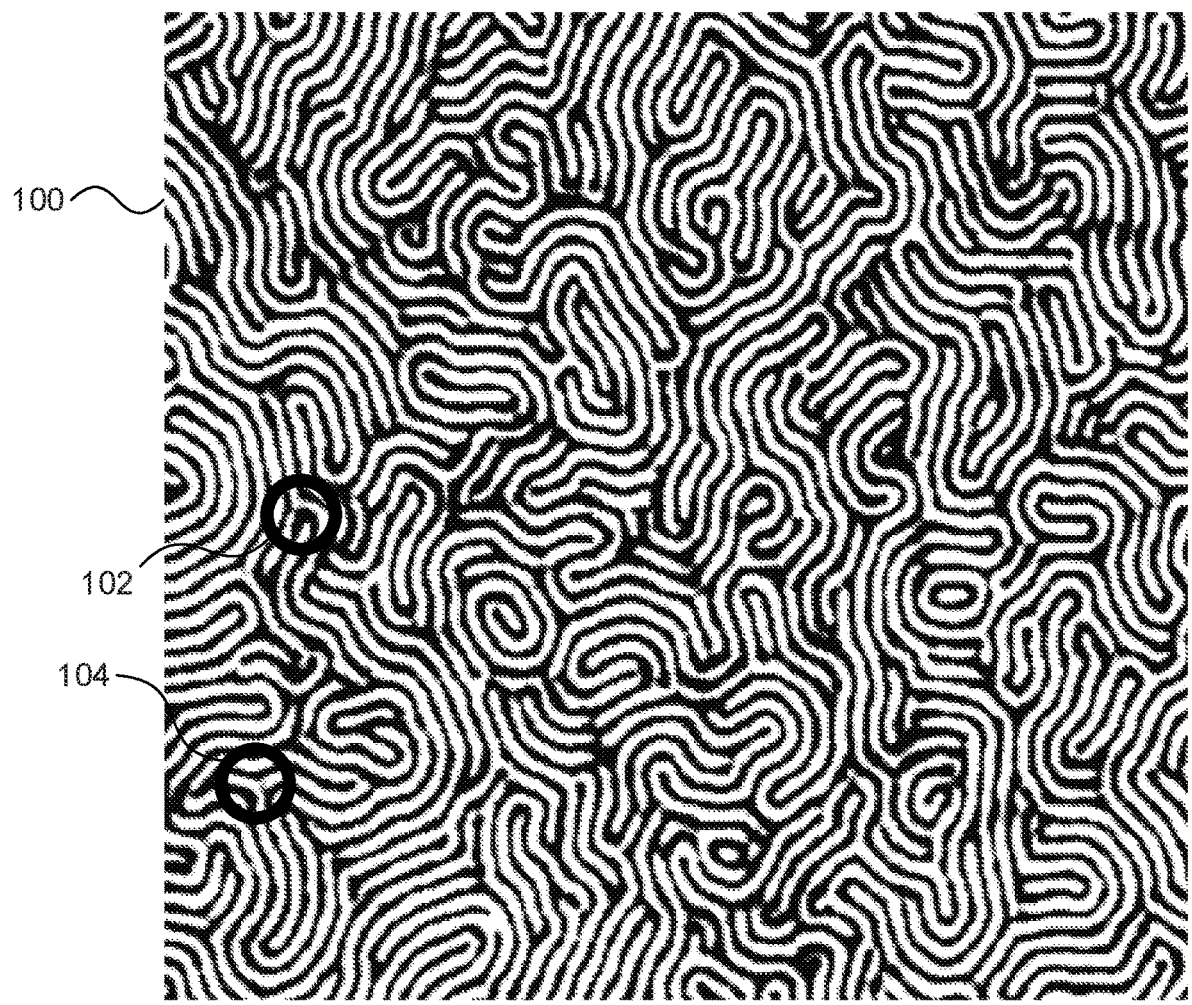
FIG. 1 is a diagram of a random physical structure that includes optically identifiable physical features in accordance with an embodiment of the present invention.

Referring now to the drawings in which like numerals represent the same or similar elements and initially to FIG. 1, an exemplary self-assembled random structure 100 is shown. The structure is characterized by optically identifiable features such as, e.g., the physical locations of line ends 102 and branches 104. The number and locations of these features will be unique every time a self-assembled random structure 100 is generated, providing a basis for the generation of a true random number.

Figure 2:
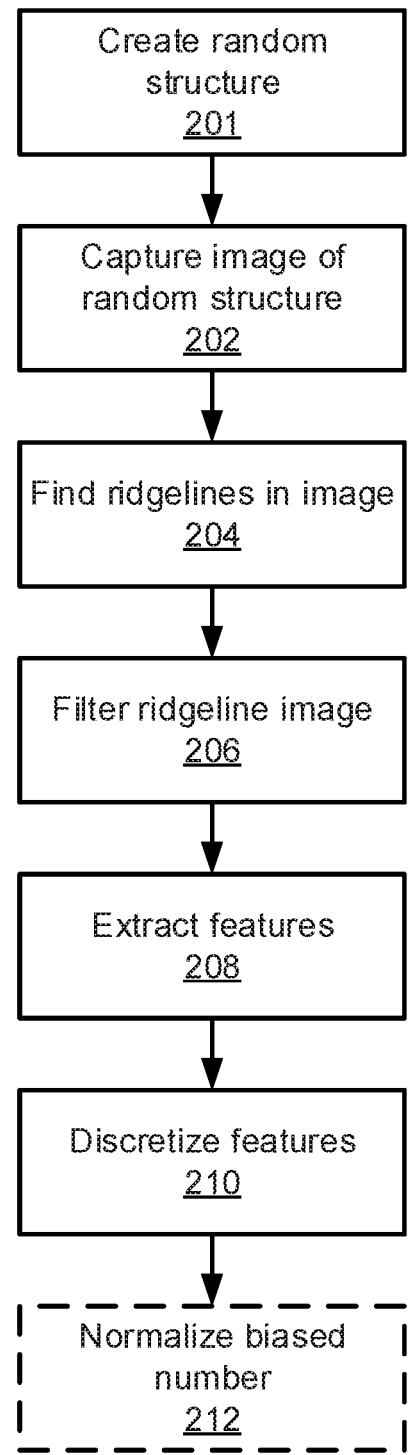
FIG. 2 is a block/flow diagram of a method for generating a random number from a random physical structure in accordance with an embodiment of the present invention.

Referring now to FIG. 2, a method of extracting a random number from a self-assembled random structure 100 is shown. Block 201 creates a random structure. It should be understood that it is specifically contemplated that a self-assembled random structure 100 may be used in this case, but any other form of random structure may be used instead. Exemplary alternatives include, e.g., graphene films and carbon nanotube films. Block 202 captures an image of a random structure using any appropriate imaging device including, e.g., an optical camera, a microscope, etc.

Block 204 processes the captured image of the random structure to discriminate between features of the physical structure. In particular, whereas the original image may be a grayscale or color image, block 204 can convert the image to a monochrome path that shows ridgelines in the image. Block 206 then filters the ridgeline image to remove noise and correct imperfections in the output.

Block 208 extracts features from the filtered ridgeline image. These features may reflect the line end features 102 or the branching features 104 described above or may alternatively reflect any reproducibly identifiable minutiae from the image. Information regarding the features may include their locations in the image and an orientation angle. Block 210 then discretizes the extracted features to convert the locations of those features in the image into strings of random numbers.

It is specifically contemplated that block 210 can discretize the image features by dividing the image into a grid and assigning a logical "one" to each grid square with a feature present and assigning a logical "zero" to each grid square without a feature present. These values can then be read out as binary values row-by-row (or column-by-column or any other appropriate ordering) to create a random number.

This process may provide biased numbers, depending on how many features are created by the self-assembly process. For example, in some embodiments there may be a much larger number of grid squares without features than grid squares with features. Block 212 therefore optionally normalizes the random number to remove any bias present.

In some embodiments, block 212 may be performed by equalizing a number of 1s and 0s in the random number. In such an embodiment, block 212 measures the relative frequencies of 0s and 1s. For example, the random number produced by a given random structure might have m=23 times as many 0s as 1s. Block 212 then separately counts the number of 0s and 1s and outputs 0s and 1s with a frequency that is inversely proportional to their input frequencies. Following the above example then, block 212 might output a 1 for every 1 in the input stream, but might only output a 0 for every twenty-third 0 in the input stream. This makes the ratio of frequencies of 0s and 1s in the output stream roughly 1:1.

In other embodiments, block 212 may discard runs of consecutive numbers. For example, considering each pair of bits, block 212 may output a 0 or a 1 for each unmatched pair of bits (e.g., a sequence of 01 or 10) and may discard matched pairs of bits (e.g., a sequence of 11 or 00).

In yet other embodiments, block 212 may perform a row/column-wise OR to normalize the output. For each row and column, block 212 may check whether any image features are present (e.g., whether any value is set to 1). Block 212 would then mark the entire row or column with a 1 if it includes such a feature and a 0 if it does not. The values for the rows and columns can then be used as the output.

In experiments where images having a resolution of 1024×1024 were split into grid squares measuring no more than 10×10 pixels each, a binary string of size 10,609 was created for each chip. This corresponded, by the binomial distribution, to an information content of about 7182 bits per image. This information content increases when the feature orientation information is considered or when a precision greater than 10×10 pixels is used. Greater precision can be obtained using tighter-pitch block copolymers in the self-assembly process or by using a smaller correlation length. Images of this size would therefore provide enough unique identifiers for every possession of every human being who will ever live.

On the other hand, alignment difficulties in making measurements of the same chip may tend to decrease the information content. Comparing small translations (e.g., about 5 pixels) to the original image shows that the information content may drop form about 7000 bits to about 2000 bits.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
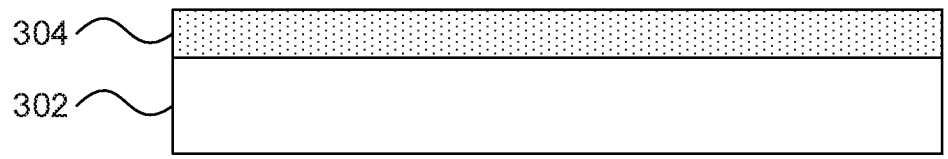
FIG. 3 is a cross-sectional diagram of a step in the formation of a random physical structure, where a polymer seed layer is formed on a substrate, in accordance with an embodiment of the present invention.

Referring now to FIG. 3, a cross-sectional view of a step in the formation of a self-assembled random structure 100 is shown. A polymer layer 304 is applied over a substrate 302. It should be understood that the substrate can be formed from any appropriate material, with semiconductor substrates being particularly contemplated. In one example, a semiconductor substrate 302 may be a silicon-containing material. Illustrative examples of silicon-containing materials suitable for a semiconductor substrate 302 include, but are not limited to, silicon, silicon germanium, silicon germanium carbide, silicon carbide, polysilicon, epitaxial silicon, amorphous silicon, and multi-layers thereof. Although silicon is the predominantly used semiconductor material in wafer fabrication, alternative semiconductor materials can be employed, such as, but not limited to, germanium, gallium arsenide, gallium nitride, cadmium telluride, and zinc selenide. Although not depicted in the present figures, a semiconductor substrate 302 may also be a semiconductor on insulator (SOI) substrate.

It is specifically contemplated that the polymer layer 304 may be a linear polymer with a functional group at the chain end that bonds with the underlying substrate 302. Brush material 304 may be deposited using, e.g., spin coating. Limited by only one functional group per chain, a monolayer of brush is bonded to substrate 302, while the excess brush can be rinsed away using solvents. The resulting thickness of the polymer layer 304 depends on the molecular size of the polymer, which is typically in the range of 2-10 nm. The brush polymer itself can be a random copolymer of the constituents of the block copolymer. For example, a polymer (styrene-random-MMA)—"end group" brush can be used for polystyrene-PMMA block copolymers.

In directed self-assembly, a pattern of structures might first be established in the polymer layer 304 to guide the self-assembly process. In the present embodiments, such guiding structures are omitted, allowing the self-assembly process to proceed randomly, without constraints.

Figure 4:
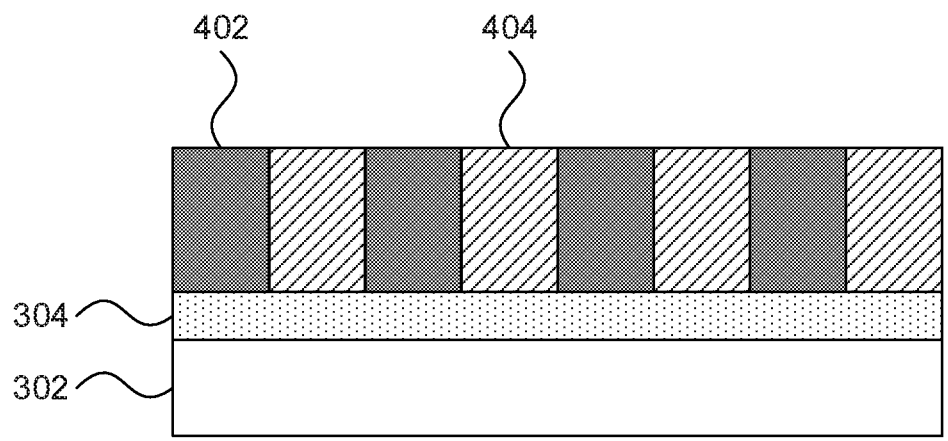
FIG. 4 is a cross-sectional diagram of a step in the formation of a random physical structure, where a block co-polymer is self-assembled on the polymer seed layer, in accordance with an embodiment of the present invention.

Referring now to FIG. 4, a cross-sectional view of a step in the formation of a self-assembled random structure 100 is shown. A layer of block copolymers (BCP) is spin-coated over the guiding pattern and annealed between about 200 and about 280° C. for between about 5 and 100 minutes under nitrogen environment to promote the self-assembly process. This self-assembly process of the BCPs will result in micro-domains, which will self-align around whatever structures form initially. A BCP material used in this case is a linear polymer chain with two blocks of chemically distinct polymers covalently bonded together. In one specific example, the self-assembling BCP material may have one block that is polystyrene, e.g., forming fins 402, and one block that is poly(methyl methacrylate) (PMMA), e.g., forming fins 404.

The lengths of the polymer chains can be selected to produce micro-domains with pitch between about 10 nm and about 200 nm. In this case, it is specifically contemplated that the self-assembling material may have halves of equal length of about 5 nm each, forming a chain with a total length of about 10 nm. When the chains self-assemble, with like ends facing one another, the resulting fins of each material are about, e.g., 10 nm in width.

It should be understood that, although the fins 402 and 404 are shown as having regular spacing, in actual practice the fins will form randomly. The sizes of the fins will be determined by the chemistry of the polymer chains as described above, and fins will tend to self-align horizontally as shown. However, as the fins align transversely as well (e.g., into and out of the page), their direction will shift and wander as shown in FIG. 1.

Figure 5:
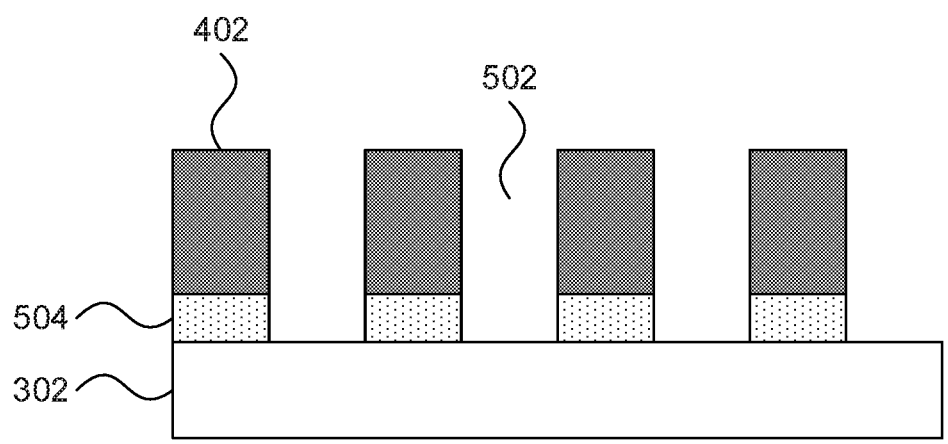
FIG. 5 is a cross-sectional diagram of a step in the formation of a random physical structure, where one set of polymer structures is etched away, in accordance with an embodiment of the present invention.

Referring now to FIG. 5, a cross-sectional view of a step in the formation of a self-assembled random structure 100 is shown. The fins of second BCP block 404 are removed by selective etching, leaving gaps 502 between the fins of first self-assembled material 402. The etch selectively removes the second self-assembled material 404 with only partial consumption of the first self-assembled material 402 and also etches down into the polymer layer 304, leaving remaining polymer 504. Depending on the etch process chosen, selectivity between the two self-assembled materials 402 and 404 is about or greater than 2. The gaps 504 thereby create the troughs in the self-assembled random structure 100, while the fins 402 create the ridges thereof. The result is a truly random ridge/trough pattern.

Figure 6:
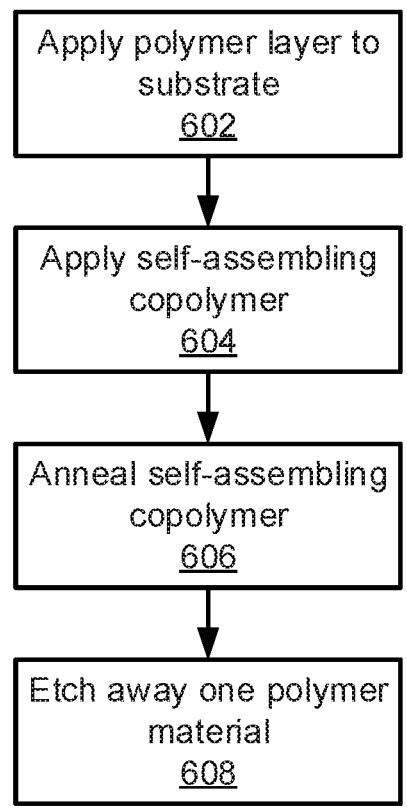
FIG. 6 is a block/flow diagram of a method of forming a random physical structure in accordance with an embodiment of the present invention.

Referring now to FIG. 6, a method of forming a self-assembled random structure 100 is shown. Block 602 forms a polymer layer on a substrate 302. As described above, this may be a brush polymer layer 304, where the polymer chains bond to the substrate at one end. The polymer layer 304 may be applied using a spin-on process to evenly distribute the material over the surface of the substrate 302.

Block 604 then applies the block copolymer to the polymer layer 304. The block copolymer self-assembles into a first set of fins 402 and a second set of fins 404, with the resulting pattern having line end features and branching features at random locations. Block 606 anneals the block copolymer, solidifying the fins and block 608 etches away one set of fins, leaving troughs 502.

Figure 7:
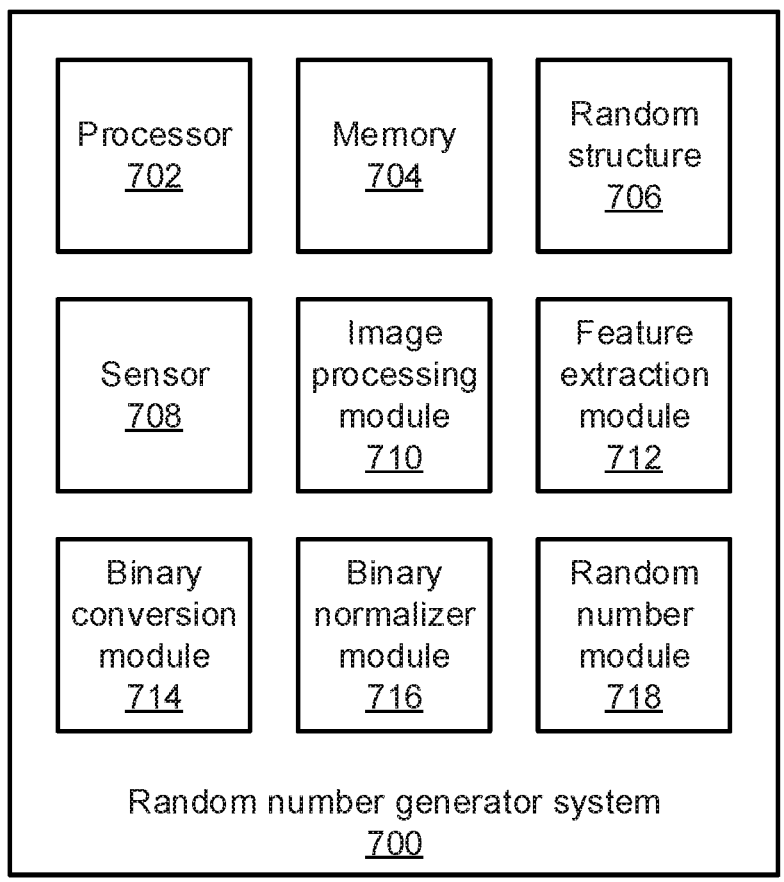
FIG. 7 is a block diagram of a random number generator system in accordance with an embodiment of the present invention.

Referring now to FIG. 7, a random number generator system 700 is shown. The system 700 includes a hardware processor 702 and memory 704. A random structure 706 (e.g., a self-assembled random structure 100) is included as well, and a sensor 708 creates images of the random structure 706. In some embodiments the random structure 706 may me swappable with other random structures, in some embodiments the system 700 may include more than one random structure 706, and in still other embodiments the system 700 may include only a single random structure 706. It is specifically contemplated that the sensor 708 may be a camera configured to create a digital image of the random structure 706, but any appropriate sensor may be used instead.

The system 700 further includes one or more functional modules that may, in some embodiments, be implemented as software that is stored in memory 704 and that is executed by hardware processor 702. In other embodiments the functional modules may be implemented as one or more discrete hardware components in the form of, e.g., application-specific integrated chips or field programmable gate arrays.

An image processing module 710 performs, e.g., ridgeline recognition and filtering on the images captured by sensor 708. Feature extraction module 712 then identifies features in the image, such as line end features 102 and branching features 104, and determines information about the features such as location and orientation. Binary conversion module 714 converts the extracted feature information into a string of binary values as described above. Binary normalizer module 716 optionally creates an unbiased number based on the output of the binary conversion module 714.

Random number module 718 then determines a random number based on the binary output of the binary conversion module 714 or the binary normalizer module 716. In some embodiments this may be performed using a pseudo-random number generating function that uses the binary output as a seed.

Figure 8:
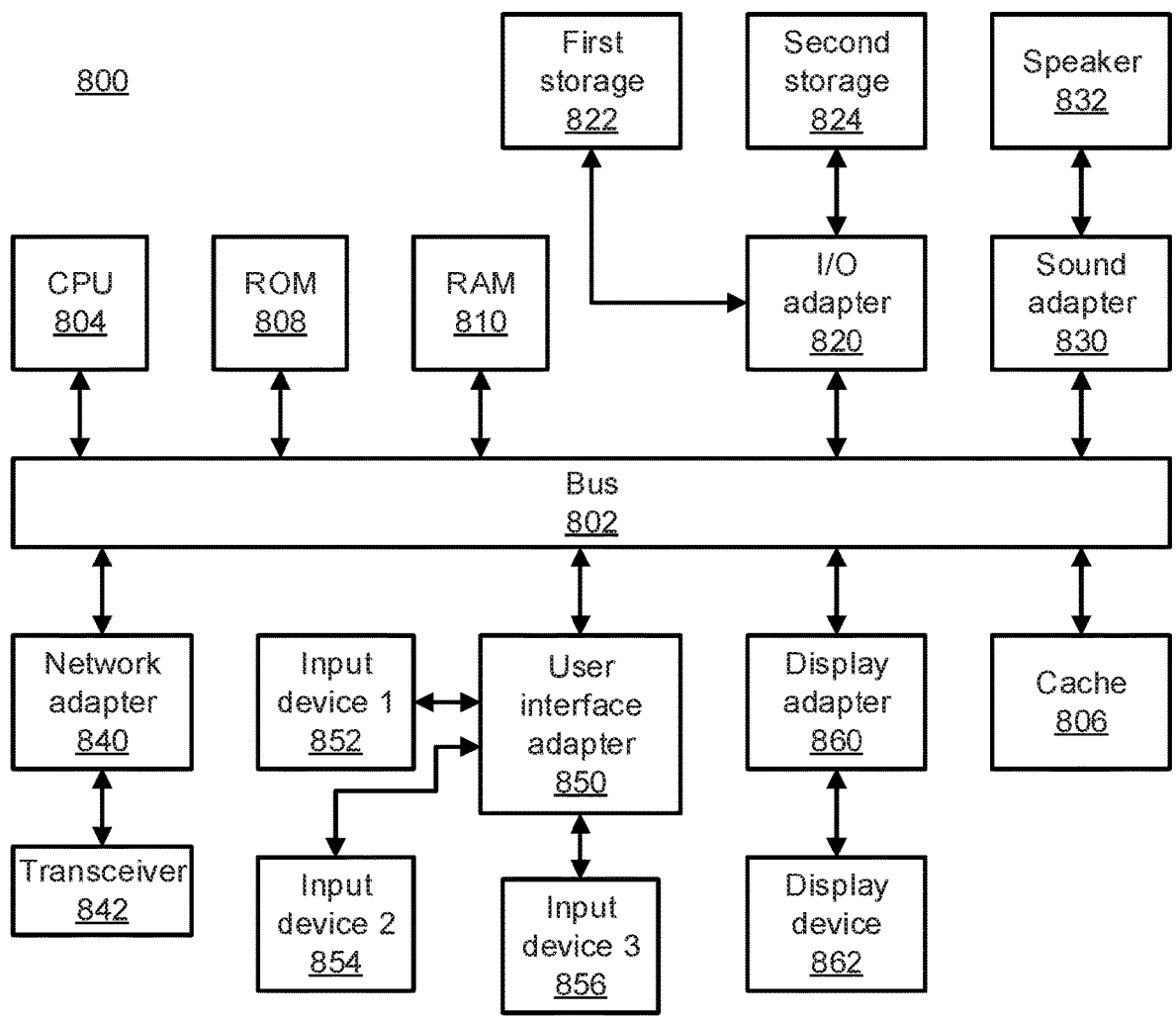
FIG. 8 is a block diagram of a processing system in accordance with an embodiment of the present invention.

Referring now to FIG. 8, an exemplary processing system 800 is shown which may represent the random number generator system 700. The processing system 800 includes at least one processor (CPU) 804 operatively coupled to other components via a system bus 802. A cache 806, a Read Only Memory (ROM) 808, a Random Access Memory (RAM) 810, an input/output (I/O) adapter 820, a sound adapter 830, a network adapter 840, a user interface adapter 850, and a display adapter 860, are operatively coupled to the system bus 802.

A first storage device 822 and a second storage device 824 are operatively coupled to system bus 802 by the I/O adapter 820. The storage devices 822 and 824 can be any of a disk storage device (e.g., a magnetic or optical disk storage device), a solid state magnetic device, and so forth. The storage devices 822 and 824 can be the same type of storage device or different types of storage devices.

A speaker 832 is operatively coupled to system bus 802 by the sound adapter 830. A transceiver 842 is operatively coupled to system bus 802 by network adapter 840. A display device 862 is operatively coupled to system bus 802 by display adapter 860.

A first user input device 852, a second user input device 854, and a third user input device 856 are operatively coupled to system bus 802 by user interface adapter 850. The user input devices 852, 854, and 856 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 852, 854, and 856 can be the same type of user input device or different types of user input devices. The user input devices 852, 854, and 856 are used to input and output information to and from system 800.

Of course, the processing system 800 may also include other elements (not shown), as readily contemplated by one of skill in the art, as well as omit certain elements. For example, various other input devices and/or output devices can be included in processing system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 800 are readily contemplated by one of ordinary skill in the art given the teachings of the present principles provided herein.

Having described preferred embodiments of self-assembly based random number generator (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for generating a random number, comprising:
    extracting feature information from a structure, formed from self-assembled block copolymers having a random physical configuration;
    converting the feature information to a string of binary values;
    normalizing the string of binary values to generate an unbiased random number using a processor, by equalizing a number of binary 1s and 0s in the string of binary values; and
    generating pseudo-random numbers using the random number as a seed to improve the security of encrypted information.

2. The method of claim 1, wherein the random physical configuration comprises a set of ridges and troughs that include line end features and branching features.

3. The method of claim 2, further comprising determining ridgelines of the image before extracting features from the image.

4. The method of claim 1, wherein the feature information comprises feature location within the image.

5. The method of claim 4, wherein converting the feature information to a string of binary values comprises assigning binary values to grid locations based on feature locations.

6. The method of claim 4, wherein the feature information further comprises an orientation of each feature.

7. The method of claim 1, further comprising forming the random structure using self-assembling block copolymers.

8. The method of claim 1, wherein equalizing the number of binary 1s and 0s comprises:
    determining a count of binary 0s;
    determining a count of binary 1s; and
    outputting 0s and 1s with a respective frequency that is inversely proportional to the respective count.

9. A non-transitory computer readable storage medium comprising a computer readable program for generating a random number, wherein the computer readable program when executed on a computer causes the computer to perform the steps of:
    extracting feature information from a structure, formed from self-assembled block copolymers having a random physical configuration;
    converting the feature information to a string of binary values;
    normalizing the string of binary values to generate an unbiased random number using a processor, by equalizing a number of binary 1s and 0s in the string of binary values; and
    generating pseudo-random numbers using the random number as a seed to improve the security of encrypted information.

10. A system for generating a random number, comprising:
    a hardware processor; and
    a memory configured to store modules that, when executed by the hardware processor, perform associated functions, including a feature extraction module configured to extract feature information from a structure, formed from self-assembled block copolymers having a random physical configuration, a binary conversion module configured to convert the feature information to a string of binary values and to normalize the string of binary values to generate an unbiased random number by equalizing a number of binary 1s and 0s in the string of binary values, and a random number module configured to generate pseudo-random numbers using the random number as a seed to improve the security of encrypted information.

11. The system of claim 10, wherein the random physical configuration comprises a set of ridges and troughs that include line end features and branching features.

12. The system of claim 11, further comprising an image processing module configured to determine ridgelines of the image before the feature extraction module extracts features from the image.

13. The system of claim 10, wherein the feature information comprises feature location within the image.

14. The system of claim 13, wherein the binary conversion module is further configured to assign binary values to grid locations based on feature locations.

15. The system of claim 13, wherein the feature information further comprises an orientation of each feature.

\* \* \* \* \*